United States Patent [19]
Ling

[11] Patent Number: 6,042,962
[45] Date of Patent: Mar. 28, 2000

[54] STRUCTURE OF A BUTTON SHAPED CELL HOLDER

[76] Inventor: Meng-Hui Ling, 4FL, No. 31, Lane 169, Kang Ning St., Hsi Chih, Taipei Hsien, Taiwan

[21] Appl. No.: 09/062,550

[22] Filed: Apr. 20, 1998

[51] Int. Cl.⁷ ....................................................... H01M 2/10
[52] U.S. Cl. .............................. 429/99; 429/96; 429/100
[58] Field of Search ..................... 429/96–100, 157–159; 136/111

[56] References Cited

U.S. PATENT DOCUMENTS

| | | | |
|---|---|---|---|
| 3,655,452 | 4/1972 | Cich ......................................... | 136/111 |
| 3,660,169 | 5/1972 | Clune ....................................... | 136/111 |
| 4,992,987 | 2/1991 | Echols ..................................... | 365/229 |
| 5,242,763 | 9/1993 | Konishi ..................................... | 429/27 |
| 5,714,716 | 2/1998 | Yamada ................................. | 174/52.1 |

*Primary Examiner*—Maria Nuzzolillo
*Assistant Examiner*—Mark Ruthkosky
*Attorney, Agent, or Firm*—Rosenberg, Klein & Lee

[57] ABSTRACT

An improved structure of a button shaped cell holder is provided which comprises a base with two round shaped grooves formed therein. One side of each round shaped groove is formed with a notch, while a flange having openings is formed on the front end of the notches for respectively receiving two sliding blocks therein. A U-shaped groove having a buckling cylinder is formed on the front end of the flange for being buckled by an elastic piece to support the sliding blocks and fix a cell within the round shaped grooves. Two long sliding grooves are respectively formed on the upper and lower ends of the round shaped grooves of the base. A sliding piece penetrates through the sliding grooves to form a shield of one of the round shaped grooves. Thus, when the button shaped cell is updated, the other round shaped groove is used for receiving a new button shaped cell. Then, the sliding piece can be displaced toward the new cell for taking out the old cell. By that arrangement, power is prevented from being interrupted when a button cell is being replaced.

2 Claims, 6 Drawing Sheets

STRUCTURE OF A BUTTON SHAPED CELL HOLDER

BACKGROUND OF THE INVENTION

The present invention is related to an improved structure of a button shaped cell holder, especially to a structure for preventing data loss due to the time it usually takes to replace the cell.

In general, an electronic notebook or dictionary have the function of storing data input by a user, therefore, the memory therewithin requires a predetermined voltage to be sustained. Thus, during updating of the cell, the power should not be interrupted. Otherwise, the input data will be lost. However, since the general user cannot understand this property, the inconvenience of data loss results.

SUMMARY OF THE INVENTION

Accordingly, the object of the present invention is to provide an improved structure of a button shaped cell holder comprising a base on the case of an electronic notebook or dictionary, and two round shaped grooves formed therein, in parallel, for receiving a button shaped cell. Two long sliding grooves are installed on the upper and lower ends of the round shaped grooves of the base, respectively, so that a sliding piece with one end having a continuously curved shape will penetrate through the sliding grooves to form a shield for one of the round shaped grooves. Thus, when a button shaped cell is updated, the round shaped groove is needed for receiving a new button shaped cell. Then, the sliding piece is pushed toward the new cell for taking out the old cell. Thus, the interruption of power is prevented so that data stored in the memory is not lost.

Another object of the present invention is to provide an improved structure of a button shaped cell holder, in which one side of the round shaped grooves are formed with notches, while a flange is formed on the front end thereof for being penetrated through by sliding blocks. The front ends of the sliding blocks each have a cambered surface.

A U-shaped groove is installed on the central front end of the flange for engagement with an elastic piece for supporting the sliding blocks. Thus, the cell may be fixed in a round shaped groove. Therefore, the cell may be updated easily and rapidly.

BRIEF DESCRIPTION OF THE DRAWINGS

The present invention will be better understood and its numerous objects and advantages will become apparent to those skilled in the art by reference to the following drawings in which:

FIGS. 5, 6, 5A and 5B are schematic views showing the action of the sliding blocks of the present invention.

DESCRIPTION OF THE PREFERRED EMBODIMENT

Figure 1:
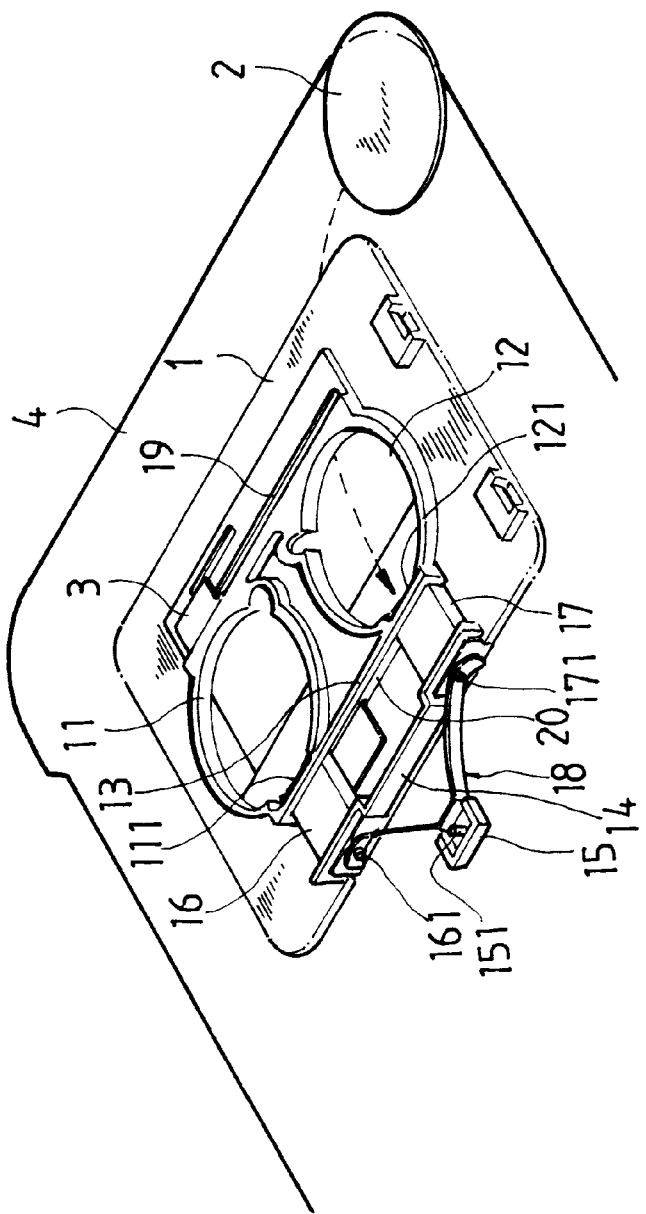
FIG. 1 is a schematic perspective view of the present invention.
Figure 2:
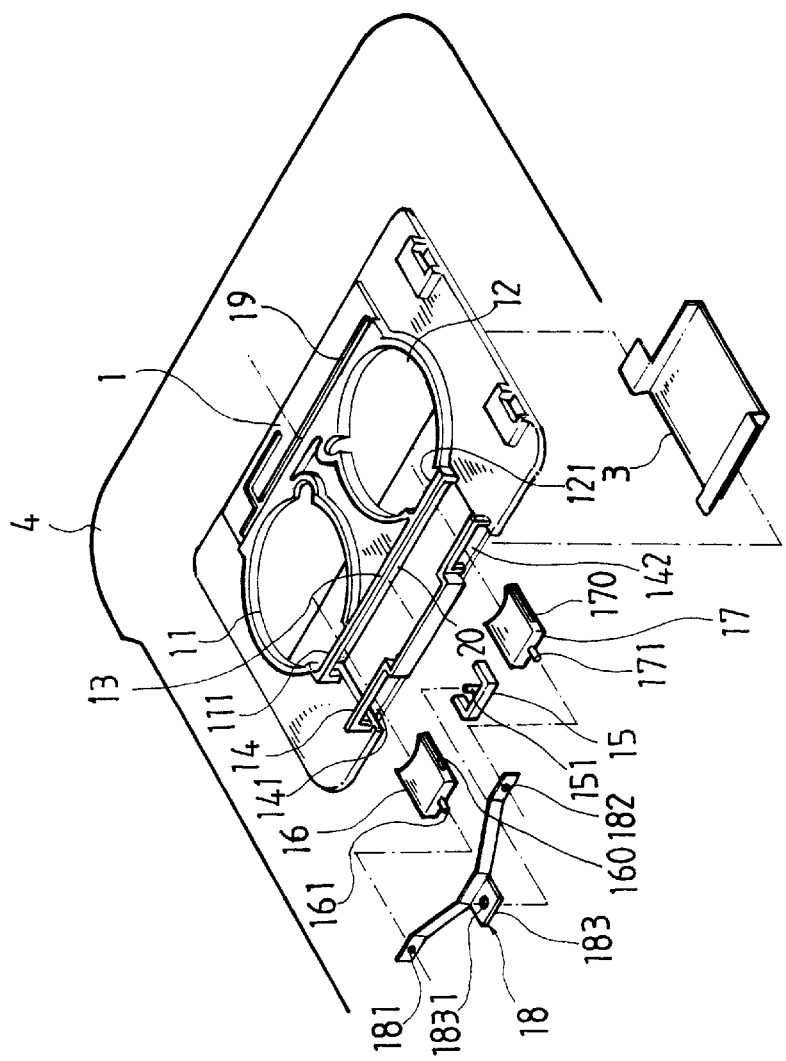
FIGS. 2 and 3 are exploded views of the present invention.
Figure 3:
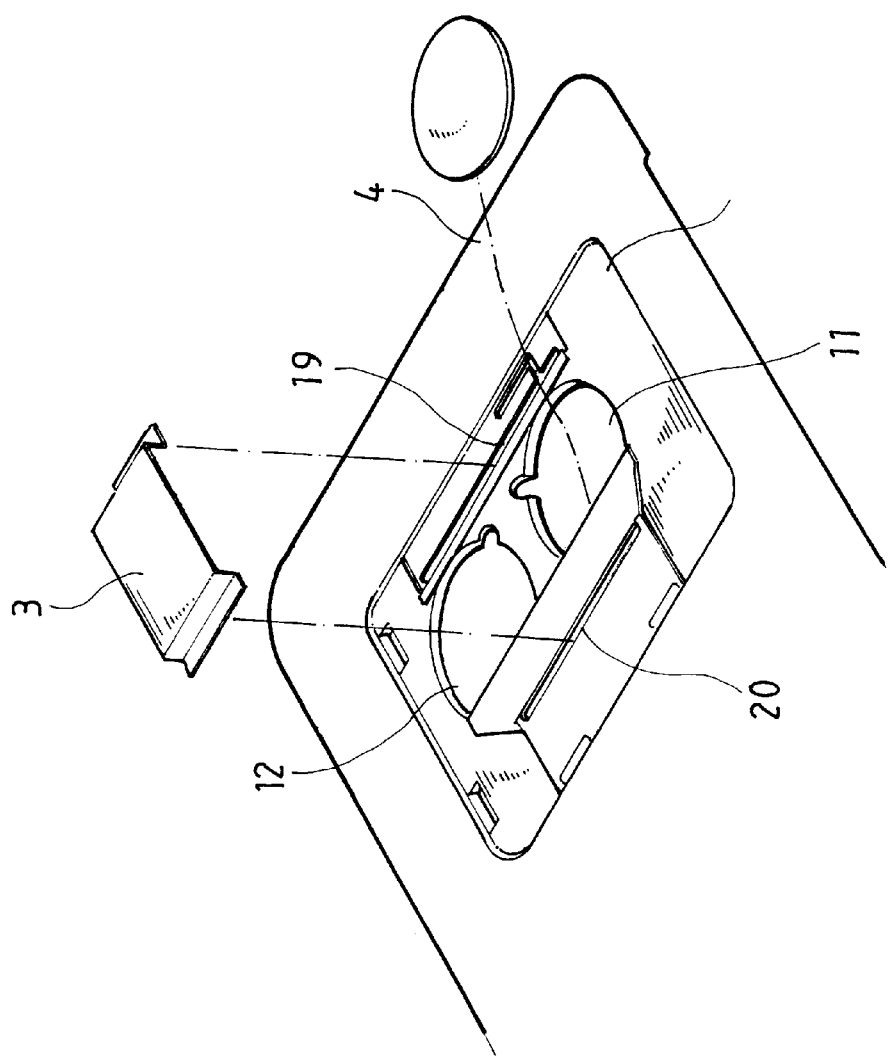

Referring to FIGS. 1, 2 and 3, the improved structure of a button shaped cell holder of the present invention is installed with a base 1, two round shaped grooves 11 and 12 are installed thereon for receiving the button shaped cell 2, and one side of the round shaped grooves 11 and 12 is formed with a notch 111 and 121, respectively, which are connected by a transverse rod 13. A flange 14 is formed on the base 1 at the front end of the transverse rod 13 and two sides thereof are formed with openings 141 and 142, with the openings 141 and 142 being correspondent to the notches 111 and 121 of the round shaped grooves 11 and 12, respectively. A U-shaped groove 15 is installed on the central front end of the flange 14 and a vertical buckling cylinder 151 is centrally formed on the U-shaped groove 15.

Two sliding blocks 16 and 17 have cambered inner surfaces and through slender openings 160 and 170 are formed in the side vertical surfaces thereof. The rear end of the sliding blocks 16 and 17 are formed with fixing cylinders 161 and 171 so that the two sliding blocks 16 and 17 extend through the openings 141 and 142 of the flange 14 and the notches 111 and 121 of the round shaped grooves 11 and 12, respectively. An outer extending elastic piece 18 is engaged with the fixing cylinders 161 and 171 of the sliding blocks 16 and 17 by through holes 181 and 182 formed in the two ends thereof. The elastic piece 18 is fixed on the buckling cylinder 151 of the U-shaped groove 15 by a through hole 1831 formed in the central horizontal surface 183 of the elastic piece 18, so that the elastic piece 18 will support the sliding blocks 16 and 17. Thus, as a button shaped cell 2 is located in a round shaped groove 11, 12, the button shaped cell 2 may be fixed.

Two long sliding grooves 19 and 20 are formed at the upper ad lower ends of the round shaped grooves 11 and 12 of the base 1, respectively, so that a sliding piece 3, with one end having a continuously vertical and horizontal curved shape, will penetrate through the sliding grooves. Thus, the sliding piece may slide along the sliding grooves 19 and 20 to form a shield for a selected one of the round shaped grooves 11 and 12.

The base 1 may be installed on the case 4 of an electronic notebook, dictionary, or other products so that the button shaped cell 2 may be easily put into the base 1 through a round shaped groove 11 or 12. When the button shaped cell is updated, the other round shaped groove 11 or 12 is needed for receiving a new button shaped cell. Then, the sliding piece 3 will be pushed toward the new cell for taking out the old cell. Thus, power is prevented from being interrupted so that data is retained in memory powered by the button shaped cell.

Figure 4:
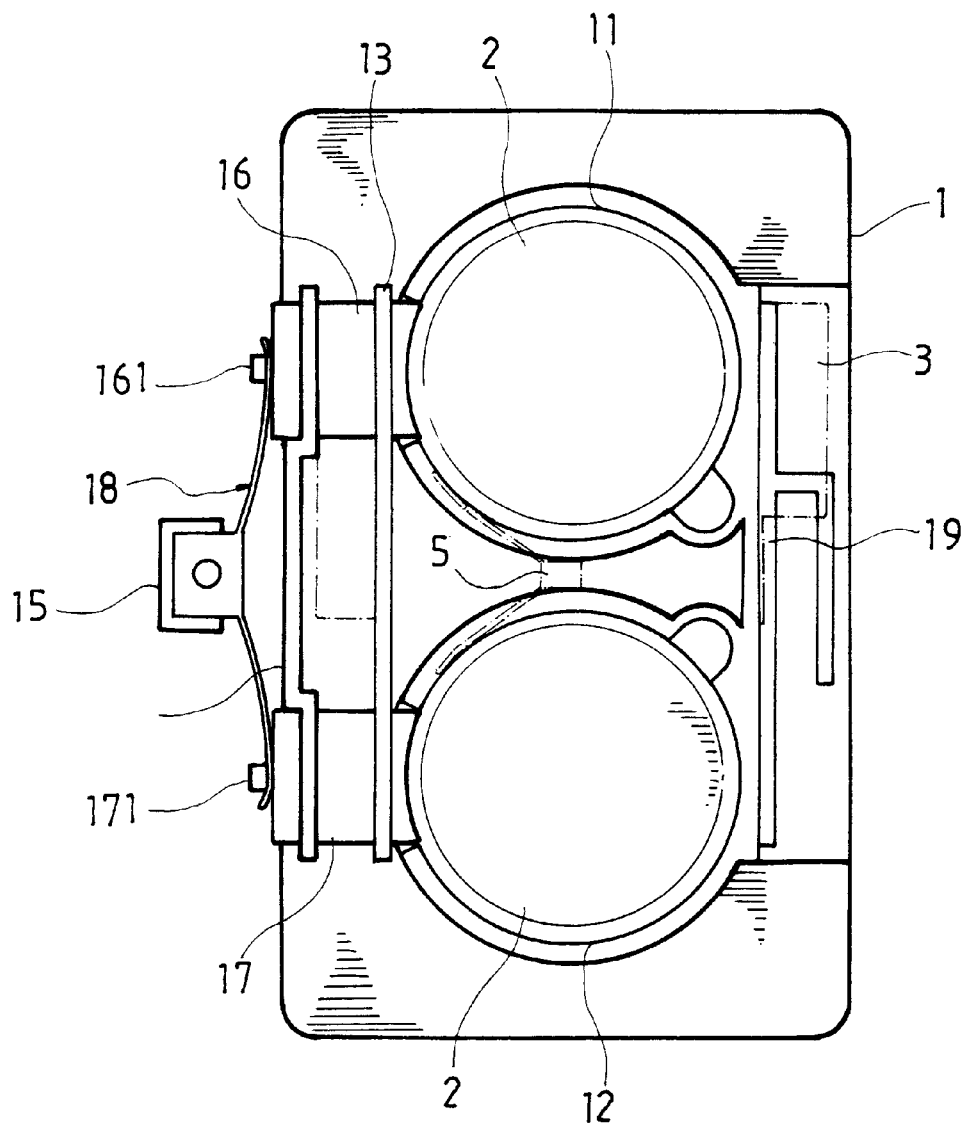
FIG. 4 is a schematic view of the embodiment of the present invention.

Now referring to FIG. 4, in using the present invention, the button shaped cell 2 is received in one of the round shaped grooves 11 and 12, and placed in a conducting condition by an elastic piece 5. The tension force of the elastic piece 18 on the sliding blocks 16 and 17 will force the sliding blocks against the periphery of the button shaped cell 2. Therefore, the function of fixing the cell in the round shaped groove is achieved, and the cell may be easily taken out or put into the base.

Figure 5:
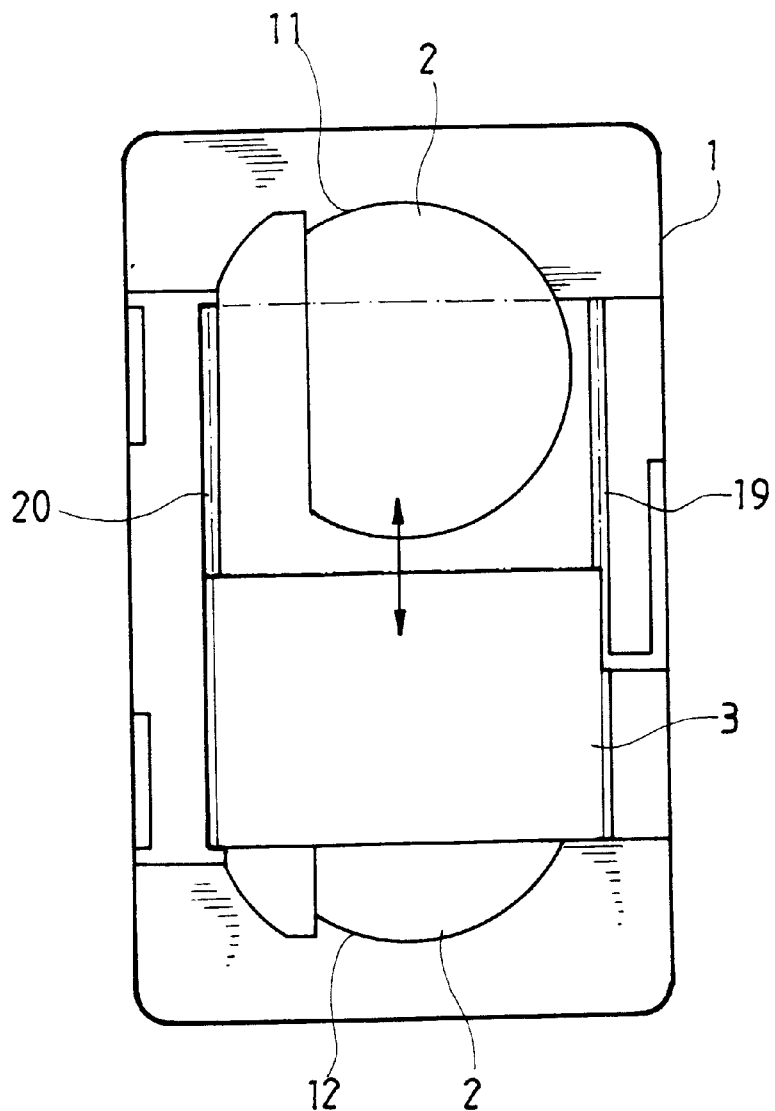
Figure 6A:
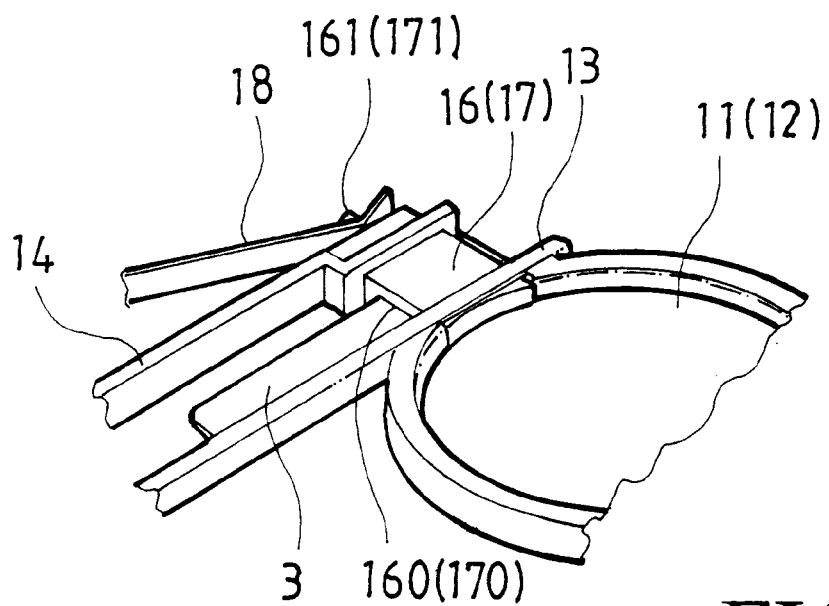
Figure 6B:
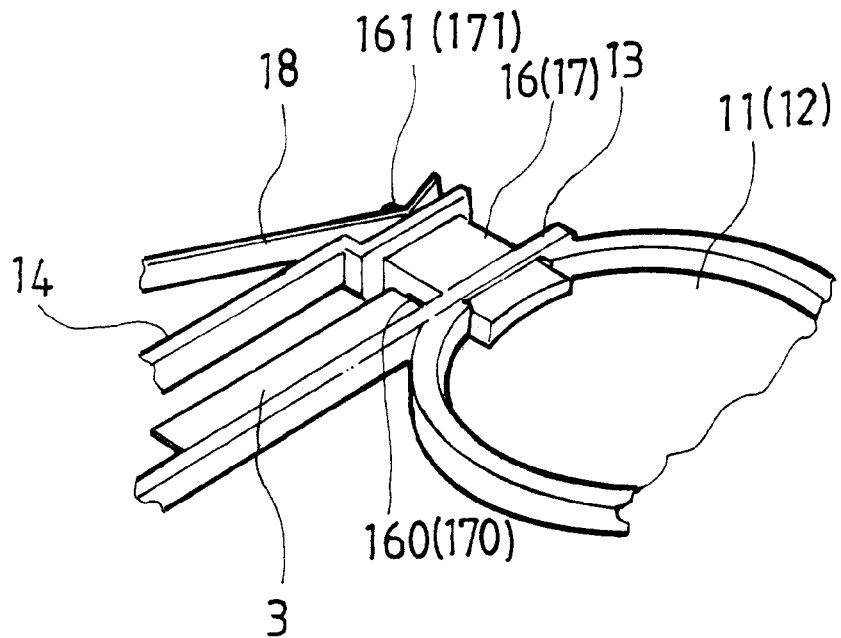

Referring to FIGS. 5, 6A and 6B, since only one cell is located in a round shaped groove 11, 12, the sliding block 17, 16 of the other round shaped groove 12, 11 is projected forwards. Thus, the sliding piece 3 cannot penetrate through the slender openings 160, 170 on the vertical surfaces of the respective sliding block 16, 17 to form as a shielding for the cell. Therefore, as the cell is updated, the other round shaped groove 11 or 12 is required for receiving a new cell. Then, the respective block 16 or 17 will move backwards. Next, the sliding piece 3 will be pushed toward the new cell, and the old cell can be removed. Accordingly, battery power will be supplied continuously and the data within the memory will be retained, improving the practical worth of the electronic notebook, dictionary, and other product using the present invention.

In summary, by the symmetric sliding blocks and sliding piece for shielding, the updating of the button shaped cell is accomplished more easily and rapidly than prior art systems. Those skilled in the art will readily recognize that various modifications and changes may be made to the present invention without strictly following the exemplary embodiment and application illustrated and described herein, and without departing from the spirit and scope of the present invention which is set forth in the following claims.

What is claimed is:

1. A structure of a button shaped cell holder, comprising:

a base having two round shaped grooves formed therein for respectively receiving button shaped cells, each of said round shaped grooves having a notch formed in one side thereof, said base having a transverse rod connecting said notches of said two round shaped grooves and a flange formed on said base at a front end of said transverse rod, said flange having a pair of openings formed therethrough in respective correspondence with said notches, said base having a U-shaped groove centrally disposed on a front end of said flange and a buckling cylinder vertically extending from said U-shaped groove, said base having a pair of longitudinally extended sliding grooves respectively formed at upper and lower ends of said round shaped grooves;

two sliding blocks respectively slidingly disposed in said pair of openings of said flange and said notches of said round shaped grooves, each of said sliding blocks having a cambered inner surface and slender openings formed in vertical side surfaces thereof;

an outer extending elastic member respectively engaged with said two sliding blocks on opposing ends thereof, said elastic member having a centrally disposed horizontal surface with a hole formed therethrough, said buckling cylinder passing through said hole in said horizontal surface of said elastic member to support and bias said sliding blocks to respectively fix button shaped cells in said round shaped grooves; and, a sliding piece slidably engaged with said pair of sliding grooves and displaceable over a selected one of said round shaped grooves to form a shield therefor.

2. The structure of a button shaped cell holder as recited in claim 1 where each of said sliding blocks has a fixing cylinder formed on a rear end thereof for coupling to said elastic member through a respective hole formed in said elastic member.

* * * * *